(12) United States Patent
Zhang et al.

(10) Patent No.: US 10,892,879 B2
(45) Date of Patent: *Jan. 12, 2021

(54) ENHANCED MECHANISM OF SCHEDULING REQUEST TO MULTIPLE SCHEDULERS IN A WIRELESS NETWORK WITH MULTIPLE CONNECTIVITY

(71) Applicant: HFI Innovation Inc., Hsinchu County (TW)

(72) Inventors: Yuanyuan Zhang, Beijing (CN); Chia-Chun Hsu, New Taipei (TW); Per Johan Mikael Johansson, Kungsangen (SE)

(73) Assignee: HFI Innovation INC., Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/166,320

(22) Filed: Oct. 22, 2018

(65) Prior Publication Data

US 2019/0058570 A1 Feb. 21, 2019

Related U.S. Application Data

(63) Continuation-in-part of application No. 14/918,751, filed on Oct. 21, 2015, now Pat. No. 10,111,246, (Continued)

(30) Foreign Application Priority Data

May 10, 2013 (CN) .......................... 2013 1 0172704

(51) Int. Cl.
*H04L 12/28* (2006.01)
*H04L 5/00* (2006.01)
(Continued)

(52) U.S. Cl.
CPC ............ *H04L 5/0098* (2013.01); *H04L 5/001* (2013.01); *H04L 5/0064* (2013.01);
(Continued)

(58) Field of Classification Search
CPC . H04W 28/0278; H04W 72/10; H04W 72/04; H04W 76/18
(Continued)

(56) References Cited

U.S. PATENT DOCUMENTS 9,295,077 B2* 3/2016 Guo .................. H04W 72/1268
2009/0113086 A1 4/2009 Wu et al. ......................... 710/56
(Continued)

FOREIGN PATENT DOCUMENTS

CN 101925128 A 12/2010
CN 101932007 A 12/2010
(Continued)

OTHER PUBLICATIONS

International Search Report and Written Opinion of International Search Authority for PCT/CN2014/077179 dated Sep. 5, 2014 (16 pages).
(Continued)

*Primary Examiner* — John Pezzlo
(74) *Attorney, Agent, or Firm* — Imperium Patent Works; Helen Mao

(57) ABSTRACT

Apparatus and method are provided to enhance scheduling request to multiple schedulers with inter base station carrier aggregation. In one novel aspect, the UE monitors and detects one or more SR triggering event. The UE selects one or more base stations based on predefined criteria and sends the SR to the selected one or more base stations. In one embodiment, at least one radio bearer of the UE is associated with multiple cell groups (CGs) in different base stations with association priorities. The association priorities may be
(Continued)

configured by the network, derived based on predefined UE configurations, derived from load information received by the UE, or derived from radio measurements. In one novel aspect, the UE upon detecting SR failure triggered on a triggering radio bearer, sends SR failure indication to a RRC layer or associates the triggering radio bearer with a different base station.

29 Claims, 8 Drawing Sheets

Related U.S. Application Data which is a continuation of application No. PCT/CN2014/077179, filed on May 9, 2014.

(51) Int. Cl.
    *H04W 72/10*     (2009.01)
    *H04W 72/04*     (2009.01)
    *H04W 76/27*     (2018.01)
    *H04W 76/18*     (2018.01)
    *H04W 76/15*     (2018.01)
    *H04J 1/16*     (2006.01)
    *H04W 48/20*     (2009.01)

(52) U.S. Cl.
    CPC ... *H04W 72/0413* (2013.01); *H04W 72/0453* (2013.01); *H04W 72/10* (2013.01); *H04W 76/15* (2018.02); *H04W 76/18* (2018.02); *H04W 76/27* (2018.02); *H04W 48/20* (2013.01)

(58) Field of Classification Search
    USPC .......................................... 370/252, 230, 386
    See application file for complete search history.

(56) References Cited

U.S. PATENT DOCUMENTS

| | | | |
|---|---|---|---|
| 2010/0150082 A1 | 6/2010 | Shin et al. ..................... 370/329 |
| 2010/0267378 A1 | 10/2010 | Hamabe et al. .............. 455/423 |
| 2010/0267387 A1 | 10/2010 | Stephens ....................... 455/436 |
| 2010/0284354 A1* | 11/2010 | Ostergaard ........ H04W 72/1284 370/329 |
| 2011/0086665 A1 | 4/2011 | Nakamura ..................... 455/522 |
| 2011/0321050 A1 | 12/2011 | Ho et al. ........................ 718/102 |
| 2012/0069805 A1* | 3/2012 | Feuersanger ..... H04W 72/1236 370/329 |
| 2012/0093070 A1 | 4/2012 | Huang et al. .................. 370/315 |
| 2012/0099452 A1 | 4/2012 | Dai et al. ....................... 370/252 |
| 2012/0281566 A1* | 11/2012 | Pelletier ............ H04W 72/1221 370/252 |
| 2013/0114445 A1 | 5/2013 | Wen et al. ..................... 370/252 |
| 2014/0056243 A1* | 2/2014 | Pelletier ................ H04L 5/0032 370/329 |
| 2014/0064219 A1 | 3/2014 | Quan et al. .................... 370/329 |
| 2014/0307663 A1 | 10/2014 | Huang et al. .................. 370/329 |
| 2015/0098322 A1 | 4/2015 | Chen et al. .................... 370/230 |
| 2015/0099501 A1* | 4/2015 | Kim ..................... H04W 48/16 455/418 |
| 2015/0110040 A1 | 4/2015 | Zhao ............................. 370/329 |
| 2015/0189570 A1 | 7/2015 | Chang et al. .................. 455/436 |

FOREIGN PATENT DOCUMENTS

| | | |
|---|---|---|
| CN | 101932019 A | 12/2010 |
| CN | 102761967 A | 10/2012 |
| CN | 102783234 A | 11/2012 |
| CN | 103458526 A | 12/2013 |
| EP | 2421313 A1 | 2/2012 |
| EP | 2568759 A1 | 3/2013 |

OTHER PUBLICATIONS

SIPO, search report for the CN patent application 201480026497.2 (no English translation is available) dated Aug. 1, 2018 (5 pages).

* cited by examiner

ENHANCED MECHANISM OF SCHEDULING REQUEST TO MULTIPLE SCHEDULERS IN A WIRELESS NETWORK WITH MULTIPLE CONNECTIVITY

CROSS REFERENCE TO RELATED APPLICATIONS

This application is a continuation-in-part and claims priority under 35 U.S.C. § 120 from nonprovisional U.S. patent application Ser. No. 14/918,751, entitled "Enhanced Mechanism of Scheduling Request to Multiple Schedulers in a Wireless Network with Inter Base Station Carrier Aggregation," filed on Oct. 21, 2015, the subject matter of which is incorporated herein by reference. Application Ser. No. 14/918,751 is filed under 35 U.S.C. § 111(a) and is based on and hereby claims priority under 35 U.S.C. § 120 and § 365(c) from International Application No. PCT/CN2014/077179, with an international filing date of May 9, 2014, which in turn claims priority from Chinese Application No. 201310172704.2, filed on May 10, 2013. This application claims the benefit under 35 U.S.C. § 119 from Chinese Application No. 201310172704.2. The disclosure of each of the foregoing documents is incorporated herein by reference.

TECHNICAL FIELD

The disclosed embodiments relate generally to wireless communication systems, and, more particularly, to enhanced mechanism of scheduling request to multiple schedulers in a wireless network with multiple schedulers.

BACKGROUND

A Long-Term Evolution (LTE) system offers high peak data rates, low latency, improved system capacity, and low operating cost resulting from simplified network architecture. LTE systems also provide seamless integration to older wireless network, such as GSM, CDMA and Universal Mobile Telecommunication System (UMTS). In LTE systems, an evolved universal terrestrial radio access network (E-UTRAN) includes a plurality of base stations, e.g., evolved Node-Bs (eNBs) communicating with a plurality of mobile stations referred as user equipments (UEs).

Scheduling Request (SR) is a request of scheduling radio resource for uplink (UL) transmission by the UE to the eNB. The SR informs the eNB that the UE has new data to transmit. There are two types of SR transmission: dedicated SR (D-SR), where the SR is conveyed on a dedicated resource such as physical UL control channel (PUCCH), and random access-based SR (RA-SR), where the SR is conveyed on a contention channel such as random access channel (RACH).

Carrier aggregation (CA)/radio resource aggregation is introduced to improve system throughput. With carrier aggregation, the LTE-Advance system can support higher data rate. Such technology is attractive because it allows operators to aggregate several smaller contiguous or non-continuous component carriers (CCs) to provide a larger system bandwidth, and provides backward compatibility by allowing legacy users to access the system by using one of the component carriers. LTE also allows carrier aggregation from different eNBs. Different from the traditional wireless system, with inter-eNB or inter-RAT carrier aggregation, the UE needs to associate with multiple schedulers from different base stations. For inter-BS carrier aggregation, the base stations providing the carrier components are not physically collocated, it requires transmission medium and interfaces among the base stations. However, in a real deployed system, the exchanging of information among base stations is limited by the backhaul delay and additional overhead. Therefore, to increase the flexibility and efficiency in uplink scheduling, the UE needs to be able to associate to individual schedulers in each base station. Each base station should have its own private access channels for SR, channel station information (CSI), HARQ feedback and other functions to provide instantaneous assistant for dynamic scheduling. Accordingly, the UE should have additional functions to handle communicating and coordinating with multiple schedulers from different base stations, which belong to the same or different RAT.

Improvements and enhancements are required for UE SR procedures to communicate and manage multiple schedulers from different base stations.

SUMMARY

Apparatus and method are provided to enhance scheduling request to multiple schedulers in a wireless network with inter base station carrier aggregation. In one novel aspect, the UE monitors and detects one or more SR triggering events. The UE selects one or more base stations based on predefined criteria and sends the SR to the selected one or more base stations. In one embodiment, at least one LC of the UE is associated with multiple BSs with association priorities. In one example, the association priorities are configured by the network. In another example, the association priorities are derived based on predefined UE configurations, or are derived from load information received by the UE, or are derived from radio measurements.

In one novel aspect, the UE selects base station based on a predefined selection algorithm. In one embodiment, the UE selection gives priority to dedicated access channels over contention-based access channels. In another novel aspect, the UE performs logical channel prioritization procedure based on the association priorities. In yet another novel aspect, the UE cancels an SR to be sent to a selected base station upon detecting one or more conditions comprising: a buffer status report (BSR) being transmitted to another base station, and receiving an uplink grant that allows all data to be transmitted.

In one novel aspect, the UE monitors and detects SR triggering events with bearer-binding configuration. The UE upon detecting SR failure, sends SR failure indication to a RRC layer. In one embodiment, after sending the SR failure indication to the RRC layer the UE generates an RRC message indicating a SR failure and sending the RRC message to a Radio Access Network. In one example, the UE after sending the SR failure indication to the RRC layer associates the triggering LC with a different base station.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
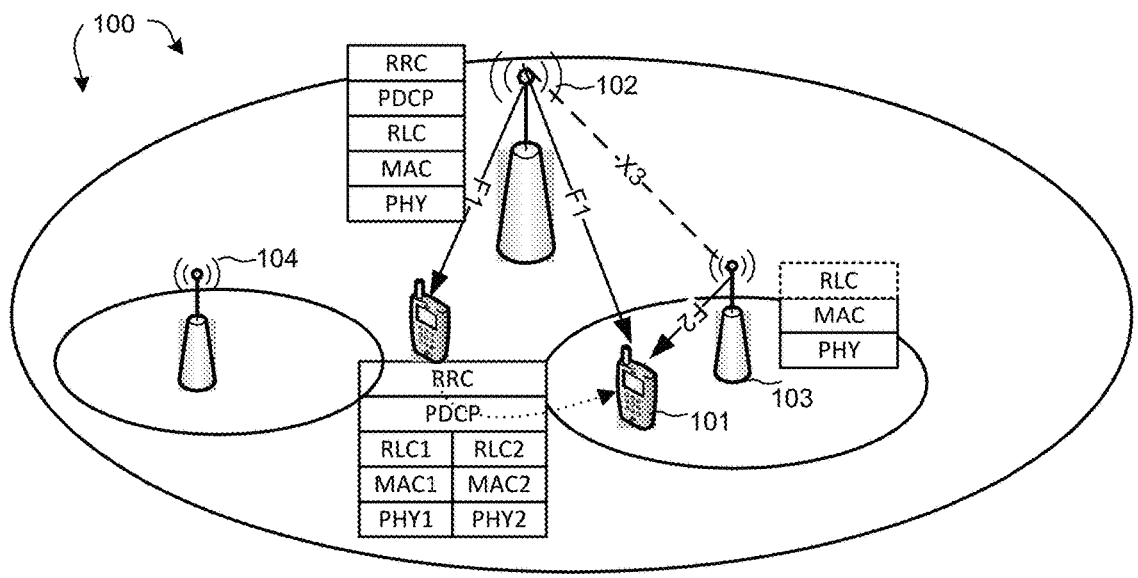
FIG. 1 illustrates a system diagram of a wireless network with inter-eNB carrier aggregation or with inter-site radio resource aggregation, which belong to the same or different RAT in accordance with one novel aspect.

FIG. 1 illustrates a system diagram of a wireless network 100 with inter-eNB carrier aggregation or with inter-site radio resource aggregation, which belong to the same or different RAT in accordance with one novel aspect. Wireless network 100 comprises a main base station eNB, also referred as an anchor eNB 102, two drift eNBs 103 and 104 and a UE 101. Wireless network 100 supports multiple component carriers over different frequency channels, and carrier aggregation for serving cells originated from different eNBs. For uplink (UL) synchronization between a UE and its base station with respect to each component carrier (CC), the UE receives an UL timing advance from the eNB, which compensates for the propagation delay between the eNB and the UE. Since UE 101 can be served with radio resources from eNB 102, eNB 103 and eNB 104, it may need to send SRs to one or more of the serving cells in wireless 100. Wireless network 100 can be an inter-RAT CC network, with the anchor eNB 102 employs one technology, for example LTE or other cellular standards, while drift eNBs 103 and 104 using different wireless standards, such as Wifi. Regardless of the inter-BS CA is from the same standard or different standard, UE 101 is configured to associate with different schedulers in each of the base stations, eNB 102, eNB 103 and eNB 104. Upon detecting a SR triggering event, UE 101 needs to first decides which base station the SR should be sent to.

In one exemplary configuration, wireless network 100 is a small cell network. Initially, UE 101 camps on the macro cell served by eNB 102. UE 101 establishes a Radio Resource Control (RRC) connection with the Radio Access Network (RAN). eNB 102 provides and controls the initial RRC connection and provides NAS mobility information and security input. eNB 102 is the anchor eNB for UE 101. In a small cell network configuration, UE 101 moves within the coverage area of anchor eNB 102 while moving into the coverage area of eNB 103. Upon entering eNB 103 coverage area, UE 101 can offload some traffic to eNB 103 if needed. In such situation, inter-eNB carrier aggregation can be configured for UE 101. UE 101 can use additional resources from eNB 103, which is a drift eNB in the small cell network system. The coordination between anchor eNB 102 and drift eNB 103 can be performed through Xn interface, for example, X3 or X2 interface. The Xn interfaces, also known as backhaul connections provide communication and coordination between eNBs. However, heavy reliance on such interface introduces undesirable delays for the system.

FIG. 1 also includes simplified block diagrams of protocol stacks in small cell network 100 for anchor eNB 102, drift eNB 103 and UE 101. At network side, the protocol stack in anchor eNB 102 includes PHY, MAC, RLC, PDCP, RRC, and a scheduler. Because drift eNB 103 has its own independent scheduler, the protocol stack in eNB 103 includes at least PHY, MAC, and a scheduler, and possible RLC too. At UE side, for UEs equipped with multiple PHY and MAC modules, they can be configured based on its usage for carrier aggregation and small cell operation. In one novel aspect of the current invention, UE 101 has multiple RLC layers with corresponding MAC layers associated with corresponding PHY layer. In one embodiment, UE 101 is equipped with RLC1 corresponding to MAC1 and established RRC connection with anchor eNB 102. As UE 101 moves into the coverage area of eNB 103, the network may decide to aggregation resources from eNB 103 to offload traffics from UE 101. Therefore, UE 101 is also configured with RLC2 corresponding to MAC2, and the corresponding PHY sub-layer, which is PHY2.

Figure 2:
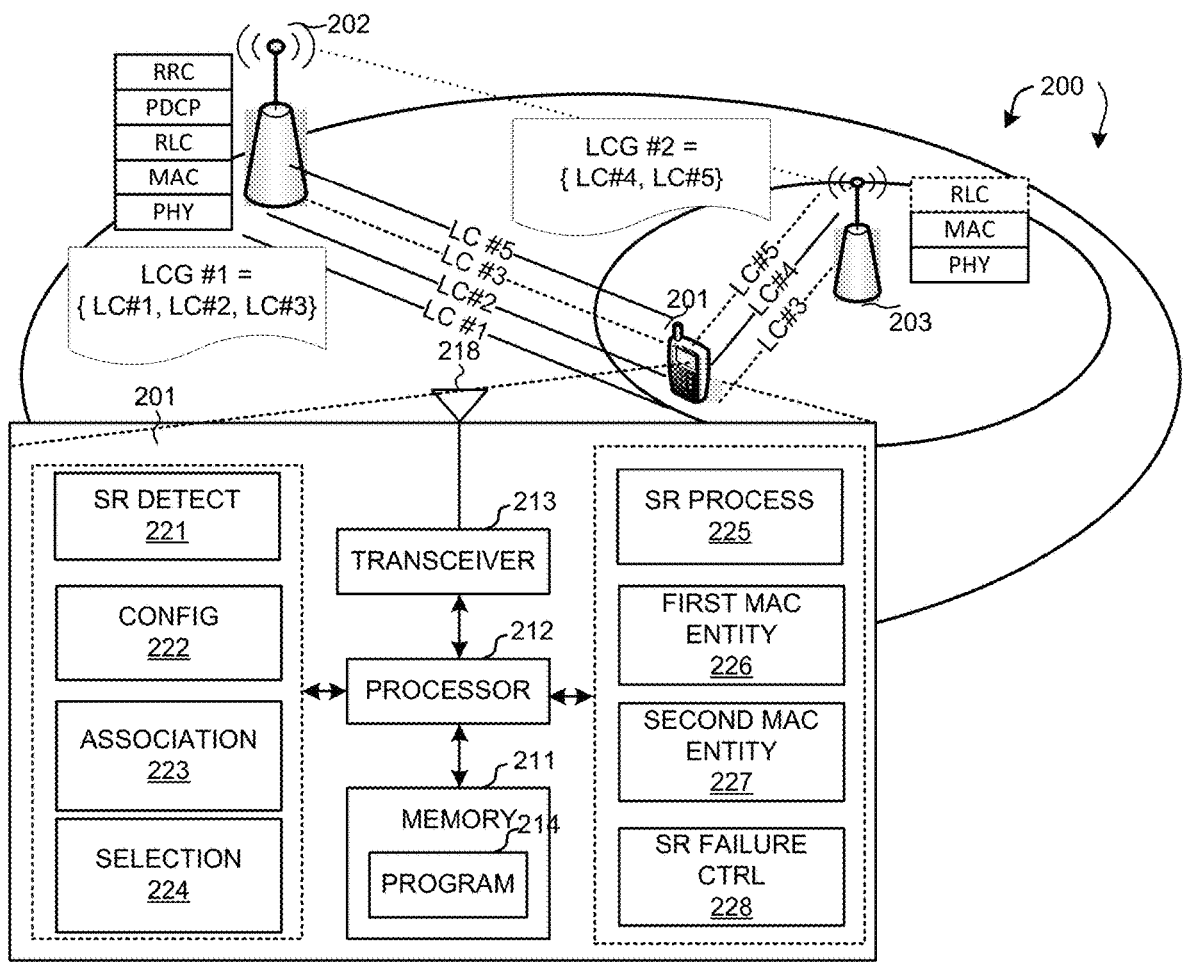
FIG. 2 is a schematic diagram of a network that supports inter-eNB or inter-RAT carrier aggregation with different types of cell groups configured for a UE in accordance with embodiments of the current invention.

FIG. 2 is a schematic diagram of a wireless network 200 that supports inter-eNB carrier aggregation with different cell groups configured for a UE 201 in accordance with embodiments of the current invention. UE 201 establishes RRC connection with anchor eNB 202. Network 200 supports inter-eNB or inter-RAT carrier aggregation. UE 201 is configured with inter-eNB carrier aggregation. When UE 201 moves into the coverage area of eNB 203, UE 201 can be configured with inter-eNB carrier aggregation. UE 201 can offload traffic from eNB 202 to eNB 203. UE 201 can be configured with multiple serving cells originated from two different eNBs, for example eNB 202 and eNB 203. eNB 202 and eNB 203 can be a mix of different wireless standards as well. UE 201 can be configured to support inter-RAT carrier aggregation. For example, eNB 203 can be a Node B in a LTE network with the same radio access as eNB 202. In another embodiment, eNB 202 may be a 4G cellular node B while eNB 203 is a UMTS/3G celluar node B. In yet another embodiment, eNB 202 and eNB20e may form a small cell network, where eNB 202 is a node B in a cellular network, while eNB 203 may be a femto cell or pico cell supporting wifi or other radio access standards. UE 201 is configured with multiple LCs, for example, LC #1 to LC #5. UE 201 is also configured with multiple logical channel groups (LCGs). LC #1 is configured for UE 201 and is associated with eNB 202. Similarly, LC #2 is associated with eNB 202, and LC #5 is associated with eNB 203. LC #3 is configured to be able to associate with eNB 202 or eNB 203. Similarly, LC #5 is configured to be able to associated with eNB 202 and eNB 203. Multiple LCGs are configured for UE 201. LCG #1 contains LC #1, LC #2 and LC #3. LCG #2 contains LC #4 and LC #5. Such configuration gives UE 201 larger bandwidth and more flexibility in aggregating resource but it poses a set of UL resource management issues. For example, upon detecting a SR triggering event, the UE has to decide which eNB this SR should be sent. In the configurations like LC #1, LC #2 and LC #4 where the LC is associated with one eNB, it is desirable to send the SR to the corresponding eNB. For LCs that are associated with different eNBs, such as LC #3 and LC #5, different algorithm is used to determine a base station to send the SR.

FIG. 2 also includes a simplified block diagram of UE 201 in accordance with novel aspects of the current invention. UE 201 comprises memory 211, a processor 212, a transceiver 213 coupled to an antenna 218. UE 201 also comprises various function modules including an SR detection module 221, a configuration module 222, an association module 223, a selection module 224, an SR process module 225, a first MAC entity 226, a second MAC entity 227 and an SR failure control module 228.

SR detection module 221 monitors and detects SR triggering events. Configuration module 222 configures multiple LCs to one or more LCGs and further associates the LCs with one or more MAC entities. Association module 223 associates a LC with one or more base stations based on predefined criteria. In one embodiment, association module may associates a single LC with multiple base stations. Selection module 224 selects a BS to send the SR based on predefined algorithms. First MAC entity 226 communicates with a first base station. Second MAC entity 227 communicates with a second base station. It is understood by one with ordinary skills in the art that more than two MAC entities can be included in UE 201 when configured. With multiple MAC entities in UE 201, UE 201 can associate with different schedulers residing in different base stations through the multiple MAC entities. SR failure control module 228 detects SR attempts failures and takes action either to re-associate the LCs to a different BS or to send a RRC message to the RAN indicating the SR failure event.

Figure 3:
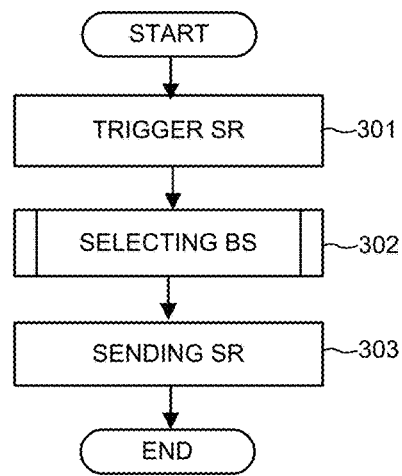
FIG. 3 is an exemplary flow diagram of sending the SR by the UE associated with multiple schedulers in accordance with embodiments of the current invention.

FIG. 3 is an exemplary flow diagram of sending the SR by the UE associated with multiple schedulers in accordance with embodiments of the current invention. At step 301, the UE detects a SR triggering event. Because the UE is associated with multiple schedulers, the UE must first decide which base station the SR should be sent to. At Step 302, the UE selects one or more base stations to send the SR. Depending on different configuration of the UE, the UE follows different algorithms in selecting the base station. At 303, the UE send the SR to the selected base station(s).

As illustrated in FIG. 3, with inter-eNB and/or inter-RAT carrier aggregation, the UE may be associated with multiple base station schedulers. There are two basic types of such association. The first one is bearer-binding association. The second type is soft-bearer-binding or no-bearer-binding. Different embodiments are designed according to the configuration type of the UE.

Figure 4:
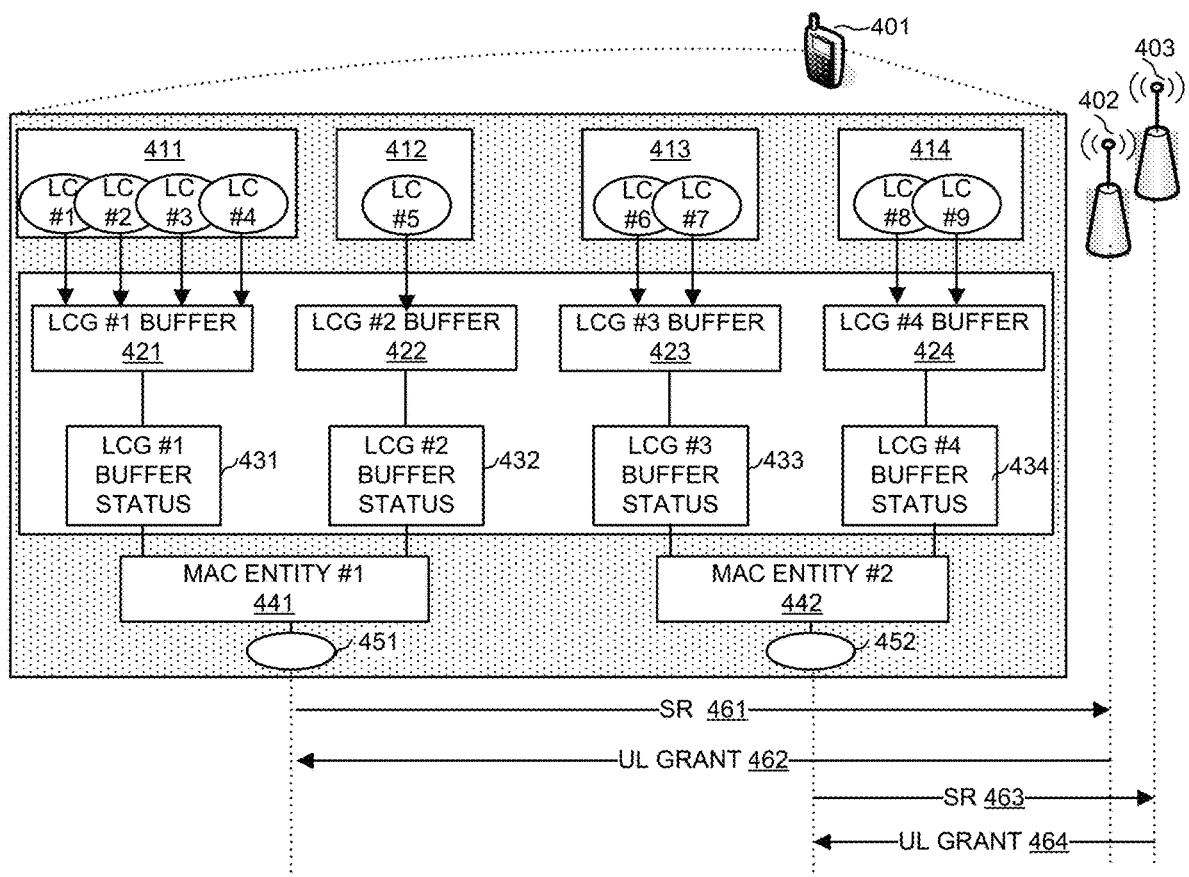
FIG. 4 is a schematic diagram of a UE transmitting SRs to different base stations with bearer-binding configuration.

FIG. 4 is a schematic diagram of a UE 401 transmitting SRs to different base stations with bearer-binding configuration. UE 401 communicates with base station BS 402 and base station BS 403. UE 401 has multiple logical channels (LC), LC#1 to LC#9, divided into a plurality of logical channel groups (LCG), LCG 411, 412, 413 and 414. Each LCG has one or more LCs, or no LC. In bearer-binding configuration, each LC is only associated with one BS. As an example shown in FIG. 1, LCG 411 has four LCs, LC#1, LC#2, LC#3 and LC#4. LCG 412 has one LC, LC#5. LCG 413 has two LCs, LC#6 and LC#7. LCG #414 has two LCs, LC#8 and LC#9. For bearer-binding configuration, each LCG has a corresponding buffer. LCG 411 has LCG#1 buffer 421. LCG 412 has LCG#2 buffer 422. LCG 413 has LCG#3 buffer 423. LCG 414 has LCG#1 buffer 424. Further, each LCG buffer has a corresponding buffer status. LCG buffer 421 has LCG#1-buffer status 431. LCG buffer 422 has LCG#2-buffer status 432. LCG buffer 423 has LCG#3-buffer status 433. LCG buffer 424 has LCG#4-buffer status 434. Each buffer status 431 to 434 is associated to only one MAC entity. Buffer status 431 and buffer status 432 are associated with MAC entity #1 441. Buffer status 433 and buffer status 434 are associated with MAC entity #2 442. MAC entity 441 and MAC entity 442 include function entity for SR processing. Each MAC entity has a corresponding physical layer. MAC entity 441 and MAC 442 have physical layer 451 and physical layer 452, respectively. MAC entity 441 and MAC entity 442 are responsible for communication with BS 402 and BS 403, respectively. The associated LCs for each MAC entity is also associated with the BS. The BSs 402 and 403 perform resource allocation on the UE 401 for the associated LCs. For example, in FIG. 4, LC#1 to LC#5 are associated with BS 402, and LC#6 to LC#9 are associated with BS 403. Accordingly, the UE 401 can send SR to the BSs 402 and 403 for UL radio resources.

UE 401 monitors and detects a SR trigger event. In one embodiment, when UE 401 detects resources are needed for data transmission, it selects one or more stations to send one or more SR requests. For bearer-binding configuration, upon detecting one or more SR trigger events, UE 401 determines for which triggering LCs, the SR triggers are. The triggering LC is the LC for which the SR triggering events occurs. Since UE 401 is configured as bearer binding, each triggering LC corresponds to one BS, UE 401 selects the one or more corresponding BSs based on the triggering LCs. If UE 401 detects the UL resource blocks (RBs) required are associated to the same BS, UE 401 sends a SR to the same BS. For example, if UE 401 detects the required data transmission all relates to BS 402, at step 461, UE 401 sends a SR to BS 402. At step 462, BS 402 responses with an UL grant. Similarly, if UE 401 detects the required data transmission all relates to BS 403, at step 463, UE 401 sends a SR to BS 403. At step 464, BS 403 responses with an UL grant. In another scenario, if UE 401 detects the UL RBs required are associated to different BSs, UE 401 sends SRs to the different BSs. For example, if UE 401 detects that some RBs required are associated with BS 402 while other RBs required are associated with BS 403, UE 401 sends SRs to both BS 402 and BS 403.

Figure 5:
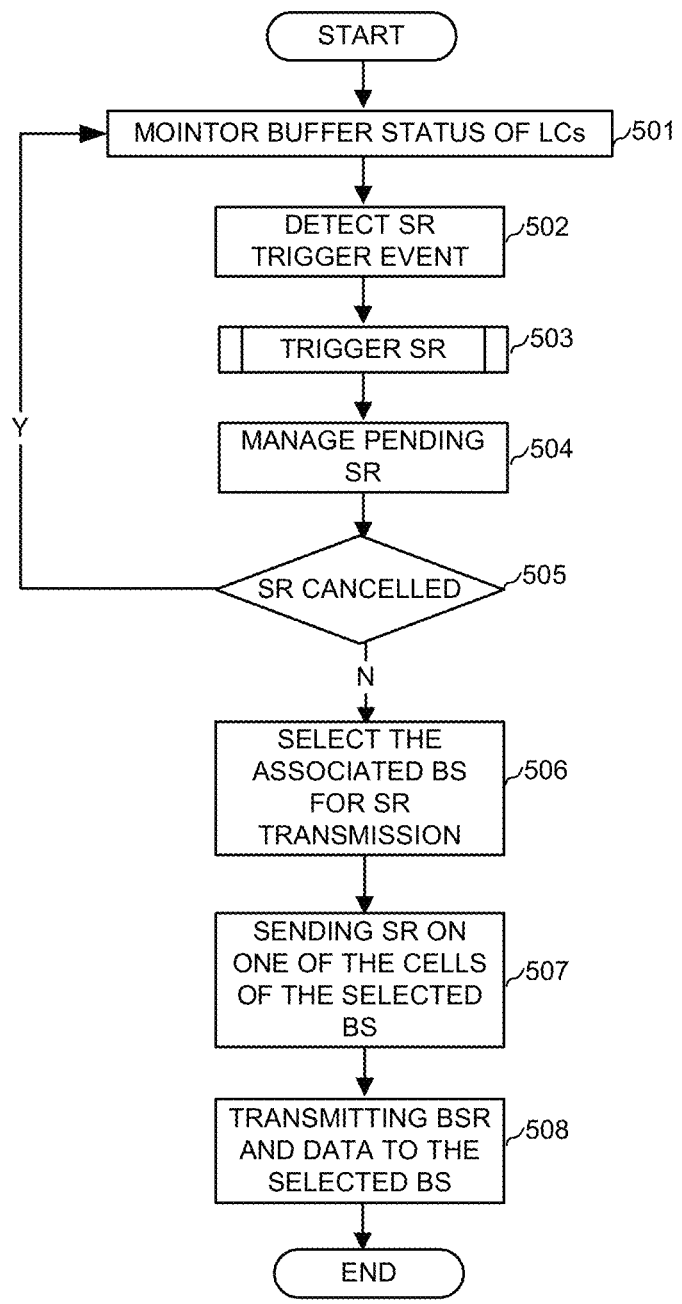
FIG. 5 is an exemplary flow diagram of SR for multiple schedulers with bearer-binding configuration in accordance with embodiments of the invention.

FIG. 5 is an exemplary flow diagram of SR for multiple schedulers with bearer-binding configuration in accordance with embodiments of the invention. At Step 501, the UE monitors buffer status of all the LCs configured. At step 502, the UE detects one or more SR triggering events. At step 503, the UE triggers a SR process. At step 504, the UE manages all pending SRs. At step 505, the UE checks if the one or more SR triggers are cancelled. At step 505 the UE determines whether the SR triggers are cancelled, if yes, the UE goes to step 501 to monitor buffer status of all configured LCs. If at step 505 the UE determines that not all SR triggers are cancelled, the UE moves to step 506. At step 506, the UE selects the associated BS based on the triggering LCs for SR transmission. At step 507, the UE selects one or more cells from the selected BSs and sends the SRs. At step 508, the UE transmits buffer status report (BSR) and data to the selected BS.

Figure 6:
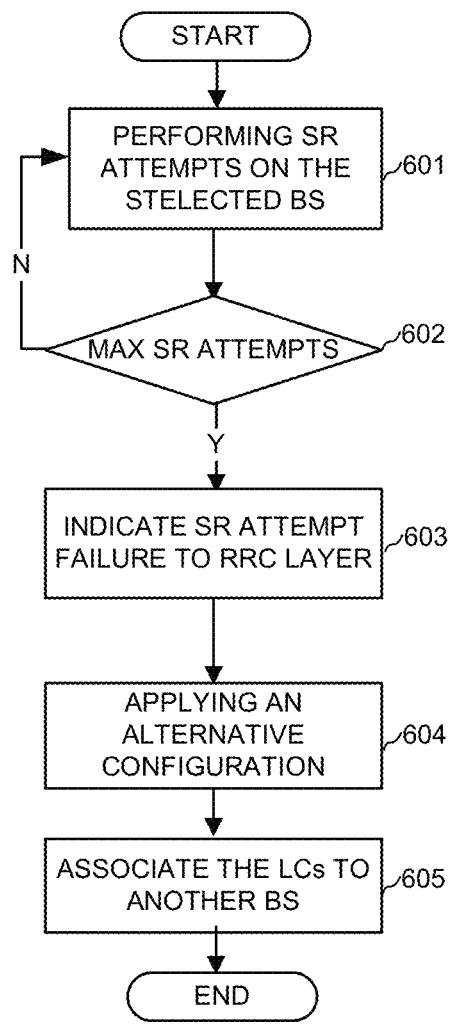
FIG. 6 is an exemplary flow diagram illustrates applying an alternative configuration after failure of SR attempts.
Figure 7:
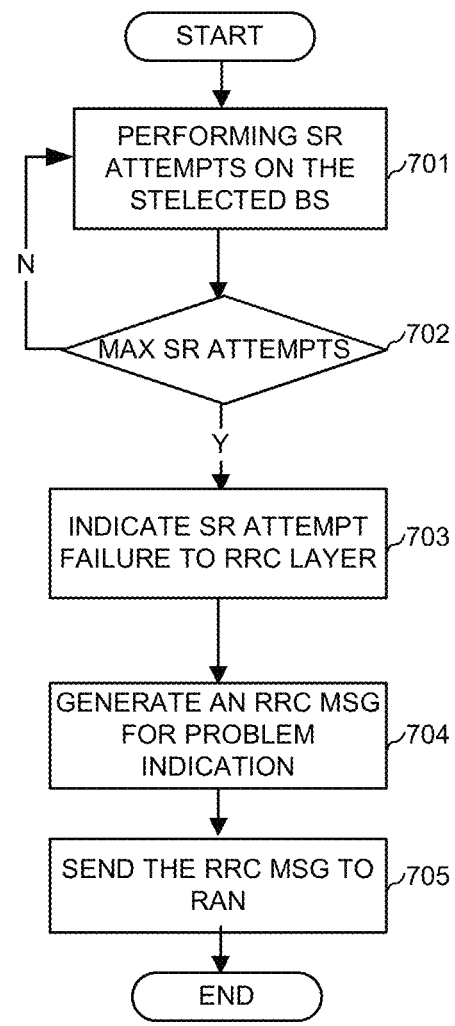
FIG. 7 is an exemplary flow diagram illustrates sending a problem report to the RAN after failure of SR attempts.

For bearer-binding configurations, each LC configured in the UE are statically associated with a base station. In one embodiment of the current invention, the binding of a LC to a BS can be updated or changed based on certain conditions. One condition is repeatedly failure of SRs to BS. It is possible that sending a SR on one of the selected BS fails after repeated attempts. In one embodiment of the current invention, a method of dealing with SR attempts failure on one of the selected BSs comprises indicating the SR attempts failure to RRC layer. After receiving the indication, RRC layer applies an alternative configuration. For example, the LCs originally associated to the selected BS are re-assigned to another BS. Then UE associates the LCs with another MAC entity, which is responsible for the communication to the re-assigned BS. In another embodiment of the current invention, the RRC layer of the UE generates a RRC message indicating that there is a problem with the communication to the selected BS and SR attempts to the BS failed. The message is sent from the UE to the radio access network (RAN). The two embodiments can apply to non-bearer-binding configuration as well. FIG. 6 and FIG. 7 illustrates exemplary flows for the two embodiments.

FIG. 6 is an exemplary flow diagram illustrates applying an alternative configuration after failure of SR attempts. At step 601, the UE performs SR attempts on the selected BS(s). At step 602, the UE determines if a maximum number of SR attempts has reached. The maximum number of SR attempts can be predefined or dynamically configured. If step 602 determines that the maximum number of SR attempts has not reached, the UE moves back to step 601. If at step 602, the UE determines that maximum number of SR attempts has reached, it moves to step 603, otherwise go back to step 601. At step 603, the UE indicates to its RRC layer that SR attempts failed for one or more LCs. At step 604, the UE applies alternative configuration based on the SR attempts failure. At step 605, the UE associates the LCs to another BS.

FIG. 7 is an exemplary flow diagram illustrates sending a problem report to the RAN after failure of SR attempts. At step 701, the UE performs SR attempts on the selected BS. At step 702, the UE determines if a maximum number of SR attempts have reached. The maximum number of SR attempts can be predefined or dynamically configured. If step 702 determines that the maximum number of SR attempts has not reached, the UE moves back to step 701. If at step 702, the UE determines that maximum number of SR attempts has reached, it moves to step 703. At step 703, the UE indicates to its RRC layer that SR attempts failed for one or more LCs. At step 704, the UE generates a RRC message to indicate the SR attempts failure problem. At step 705, the UE sends the generated RRC message to the RAN.

The second type of UE associating with multiple schedulers is soft-bearer-binding or no-bearer-binding. In soft-bearer-binding configuration, a LC is configured to be associated with multiple BSs with different preference for different BSs. In no-bearer-binding configuration, a LC is not bound to a BS but can be dynamically associated with different BSs without any preference.

Figure 8:
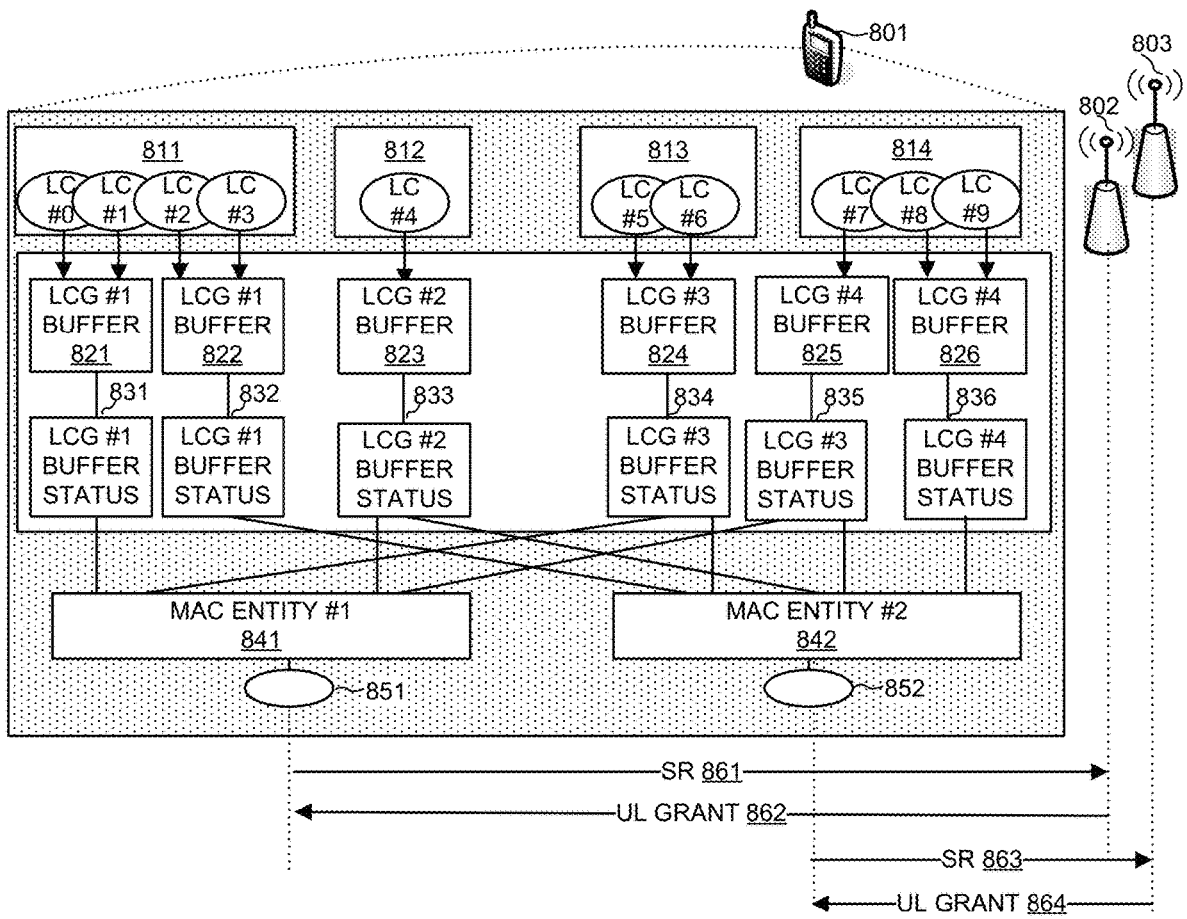
FIG. 8 is an exemplary schematic diagram of a UE transmitting SRs to different base stations with soft-bearer-binding or no-bearer-binding configuration.

FIG. 8 is an exemplary schematic diagram of a UE transmitting SRs to different base stations with soft-bearer-binding or no-bearer-binding configuration. A UE 801 communicates with a BS 802 and a BS 803. UE 801 has multiple LCs, LC#0 to LC#9, divided into a plurality of LCGs, LCG 811, LCG 812, LCG 813, and LCG 814. Each LCG has one or more LCs, or no LC, and corresponds to one or more than one buffers. For example, LCG 811 has four LCs, LC#0, LC#1, LC#2 and LC#3. LCG 812 has one LC, LC#4. LCG 813 has two LCs, LC#5 and LC#6. LCG 814 has three LCs, LC#7, LC#8 and LC#9. Each LCG has one or more corresponding LCG buffers. For example, LCG 811 has two LCG buffers, LCG#1 Buffer 821 for LC#0 and LC#1, and LCG#1 Buffer 822 for LC#2 and LC#3. LCG 812 has one LCG buffer, LCG#2 Buffer 823 for LC#4. LCG 813 has one LCG buffer, LCG#3 Buffer 824 for LC#5 and LC#6. LCG 814 has two LCG buffers, LCG#4 Buffer 825 for LC#7, and LCG#4 Buffer 826 for LC#8 and LC#9. Each LCG buffer is associated with a LCG buffer status. For example, LCG#1 Buffer 821 is associated with LCG#1 buffer status 831. LCG#1 Buffer 822 is associated with LCG#1 buffer status 832. LCG#2 Buffer 823 is associated with LCG#2 buffer status 833. LCG#3 Buffer 824 is associated with LCG#3 buffer status 834. LCG#4 Buffer 825 is associated with LCG#4 buffer status 835. LCG#4 Buffer 826 is associated with LCG#4 buffer status 836. Further each LCG buffer status is associated to only one MAC entity including the function entity for SR and BSR. For example, LCG#1 buffer status 831, LCG#1 buffer status 832, LCG#2 buffer status 833 are each associated with MAC entity#1 841. LCG#3 buffer status 834, LCG#4 buffer status 835, LCG#4 buffer status 836 are each associated with MAC entity#2 842. Each MAC entity has one corresponding physical layer that communicates with a corresponding BS. For example, MAC entity#1 841 has a physical layer 851, which communicates with BS 802. MAC entity#1 842 has a physical layer 852, which communicates with BS 803. The associated LCs for each MAC entity is also associated with the BS. BS 802 and BS 803 perform resource allocation on the UE 801. Accordingly, the UE 801 can send SR to BS 802 and BS 803 for UL radio resources.

When UE 801 is configured with soft-bearer-binding, a LC can be associated with multiple BSs. If a LCG contains one or more LCs, for which a prioritized BS is configured for data transmission, each LC will correspond to one or more than one buffer. Each buffer is associated to a MAC entity corresponding to a BS. For example, LC#0, LC#1, LC#2 and LC#3 (corresponding to RB0, RB1, RB2 and RB3 respectively) belongs to LCG 811. LC#0 is configured to transmit only to BS 802, so LC#0 is associated to BS 802. LC#1 is prioritized transmit through BS 803, so LC#1 is associated with BS 803. As illustrated, even though LC#0 to LC#3 belong to the same LCG, LCG 811, they are associated with different BSs. Further, some LCs can associate with multiple BSs. For example, LC#4 may be configured with no prioritized BS for data transmission. Therefore, LC#4 can associate with both BS 802 and BS 803 for SR transmission. Similarly, LC#5 to LC#8 may be configured with no prioritized BS for data transmission. Therefore, upon detecting SR trigger for one or more LCs of LC#5 to LC#8, UE 801 can transmit the one or more SRs to both BS 802 and/or BS 803. Once one or more BSs are selected for transmitting the SRs, UE 801 transmits SRs through corresponding MAC entities. For examples, at step 861, UE 801 transmits a SR to BS 802 through MAC entity#1 841 via physical layer 851. At step 862, UE 801 receives an UL grant from BS 802. Similarly, at step 863, UE 801 transmits a SR to BS 803 through MAC entity#2 842 via physical layer 852. At step 864, UE 801 receives a UL grant from BS 803.

For the offloading method of soft bearer binding, each RB has the preference to which BS the SR and data shall be transmitted. Therefore, different radio bearers have different prioritized BSs for SR transmission. It can also be configured whether the radio bearer can be transmitted through non-prioritized BSs. If the radio bearer is not allowed to transmit through the non-prioritized BSs, the SR and BSR for the radio bearer can only be reported to the prioritized BS. Otherwise, the SR and BSR for the RB can be reported to the non-prioritized BSs. UE associates each LC corresponding to each RB to one or multiple BSs and the different multiple associations of a RB or LC have different priorities. For example, for each RB or LC, each BS is assigned a different priority e.g. $BS_1 >= BS_2 >= BS_3 \ldots >= BS_n$. The LCs associated to one or multiple BSs also belong to a LCG according to the configuration. For the offloading method of no bearer binding, each RB has no preference to which BS the SR and data shall be transmitted. Such RB can be associated to both of the BSs.

Figure 9:
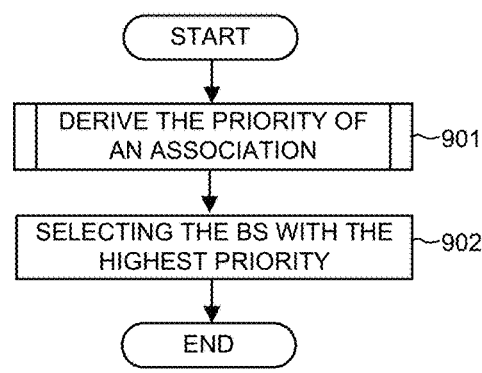
FIG. 9 is an exemplary flow diagram of selecting a BS for SR transmission for soft-bearer-binding or no-bearer-binding configuration based on priorities of association.

FIG. 9 is an exemplary flow diagram of selecting a BS for SR transmission for soft-bearer-binding or no-bearer-binding configuration based on priorities of association. At step 901, the UE derives priority of an association. At step 902, the UE selects the BS with the highest priority for SR transmission. There are different ways to derive the priority of an association.

In one embodiment of this invention, the UE receives the association configuration from RAN through the RRC message. The UE associates each LCs or RBs to one or multiple BSs based on the received configuration. So the association for each RB or LC is configured by RRC configuration. For example, the UE is configured with LC0 to LC6. The UE further receives a RRC configuration from the RAN. The RRC configuration message configures a BS1 is the prioritized BS for LC0 to LC3 and BS2 is the prioritized BS for LC4 to LC6. After receiving the RRC configuration massage, the UE applies the configuration. The UE will associate LC0 to LC3 with BS1 and LC4 to LC6 with BS2 based on the configuration. The BS1 and BS2 perform resource allocation for the associated RBs or LCs on the UE. Accordingly, the UE can send SR to BS1 for the associated LC0 to LC3 and send SR to BS2 for the associated LC4 to LC6.

In another embodiment of the current invention, the priority of an association is derived from other configuration and may be based on certain criterion implicitly. The BSs or the group of cells satisfying the criterion will have the highest priority. The criterion includes but not limited to the following ones: a BS or group of cells that houses a CA primary cell, a BS with cells of the type femto cell or pico cell, a BS with cells on certain carrier frequencies. The priority of an association can also be derived from load information of the BSs. For example, the BS or the group of cells that have the lowest load has the highest priority. The load information can be broadcasted through system information (SI). After acquisition of the system information from different BSs, the UE compares the load among different BSs, and selects the BS with the lowest load.

In yet another embodiment of the current invention, the priority of an association can be derived from radio measurements. For example, a BS or group of cells that have the lowest pathloss to the UE will have the highest priority. After measuring the pathloss of different BSs and the group of cells, UE compares the measurement results among different BSs and selects the BS with lowest pathloss.

The UE can send a SR through dedicated resources such as PUCCH or through contention based random access channel such as RACH. Accordingly, in selecting one or more BSs for the transmission of SR, the UE may select a BS based on the type of SR channel configured. In one embodiment, the UE would first select the BS with dedicated resources configured for SR. in other case, the UE selects the BSs with dedicated channel configured. The UE then derives the priority of the associations with the selected BSs and selects the BSs one after another based on the priority order for SR transmission until either the SR attempts on one of the selected BS succeed or the SR attempts on all the selected BSs fail. If the SR attempts through dedicated access channels on all the BSs failed, the UE would select the BSs with contention access channel configured. The UE subsequently derives the priority of the associations with the selected contention-based BSs and selects the BSs one after another based on the priority order for SR transmission until either the SR attempts on one of the selected BS succeed or the SR attempts on all the selected BSs fail.

Figure 10:
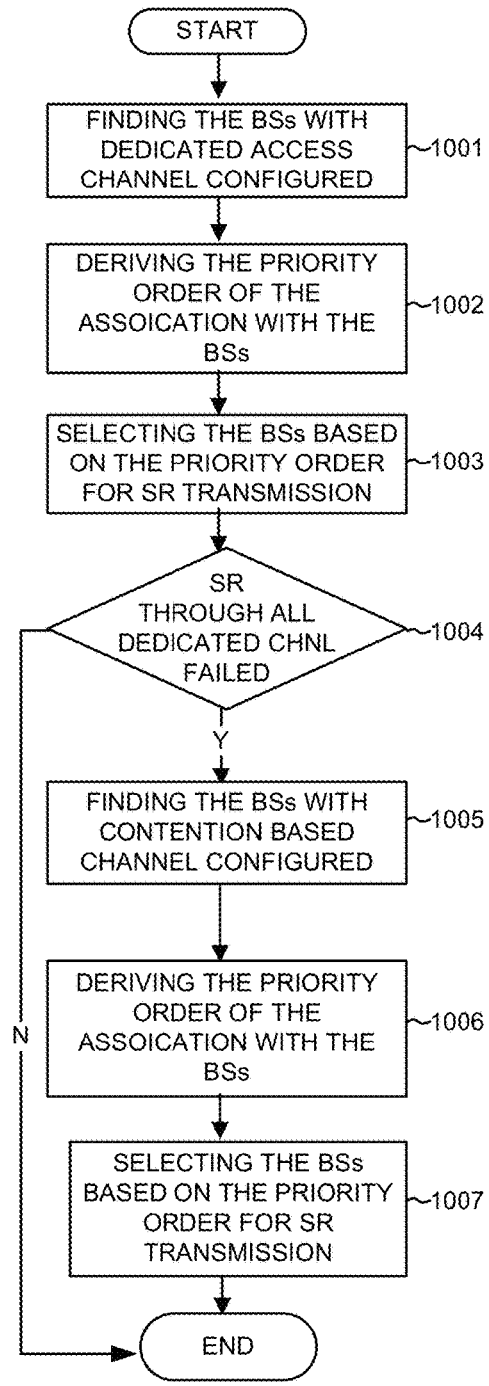
FIG. 10 shows an exemplary flow diagram of selecting a BS for a UE with different access channels configured.

FIG. 10 shows an exemplary flow diagram of selecting a BS for a UE with different access channels configured. In one embodiment of the current invention, dedicated access channel takes precedence over contention-based channels. The UE will use dedicated access channel for SR transmission first and then contention channels. For example, the prioritization for dedicated access channel among BSs is $BS_1 >= BS_2$ and the prioritization for contention access channels among BSs is $BS_2 >= BS_3$. Upon detecting a SR triggering event, the UE first selects $BS_1$ because $BS_1$ has higher priority for dedicated channel. The UE transmits SR through the dedicated access channel associated with $BS_1$. Only when the attempts on dedicated channels with $BS_1$ and $BS_2$ all failed, the UE selects contentions-based channels. In selecting contention-based channels, the UE first selects $BS_2$ because $BS_2$ has higher priority for contention-based channels. The UE subsequently to transmit SR through the contention channels associated with $BS_3$. So a lower priority access channel is used only if a number of unsuccessful attempts have been performed using the higher priority access channels. As shown in FIG. 10, at step 1001, the UE finds the BSs with dedicated access channel configured. At step 1002, the UE derives the priority order of the association with the BSs configured with dedicated access channel. At step 1003, the UE selects the BSs with dedicated access channels based on the priority order for SR transmission. At step 1004, the UE determines whether the SR attempts through dedicated channel failed for all BSs. If in step 1004 UE finds the SR attempt succeeded in one or more BSs, the UE terminates the selecting procedure. If Step 1004 finds that all SR attempts on all configured dedicated resources are failed, then the UE moves to step 1005. At step 1005, the UE finds the BSs with contention-based access channel configured. At step 1006, the UE derives the priority order of the association with the contention-based BSs. At step 1007, the UE selects the BS based on the priority order for the SR transmission. In one embodiment of the current invention, the UE declares radio link failure (RLF) upon all SR attempts failed on all the available contention-based channels.

The selecting of BS for SR transmission also applies to other UL transmissions, including BSR and data transmissions. When multiplexing and assemble PDUs based on the UL grants received from a BS, the associated LCs should have higher priority. The radio resources should be allocated to the data available for transmission from the associated LCs first. If after all available data are allocated, there are still radio resources left, the pending data available for transmission from non-associated LCs will be served by the remaining UL grants. Such non-associated LCs are not restricted to be transmitted only to the prioritized BS. Therefore, if there is no UL shared channel (UL-SCH) resource available from the prioritized BS for a RB while UL-SCH resource is available from the non-prioritized BS, SR will be transmitted to the prioritized BS. BSR for the RB can be reported to the non-prioritized BS and the pending data available for transmission for the RB can be transmitted to the BS if there is any resource left.

In one embodiment of this invention, the method of multiplexing and assemble PDUs for data to be sent to a particular BS, comprise performing logical channel prioritization (LCP) procedure on the LCs, which are associated to the particular BS or for which the association with the particular BS is the highest priority, checking whether any radio resource left, and performing logical channel prioritization procedure on the LCs, which is not associated to the particular BS or for which the association with the particular BS is a lower priority, if there is any radio resource left, and continuing performing LCP on LCs in association priority order for the association to the particular BS until data or resources ends One example of logical channel prioritization procedure in E-UTRAN system is described in the MAC specification 36.321.

Figure 11:
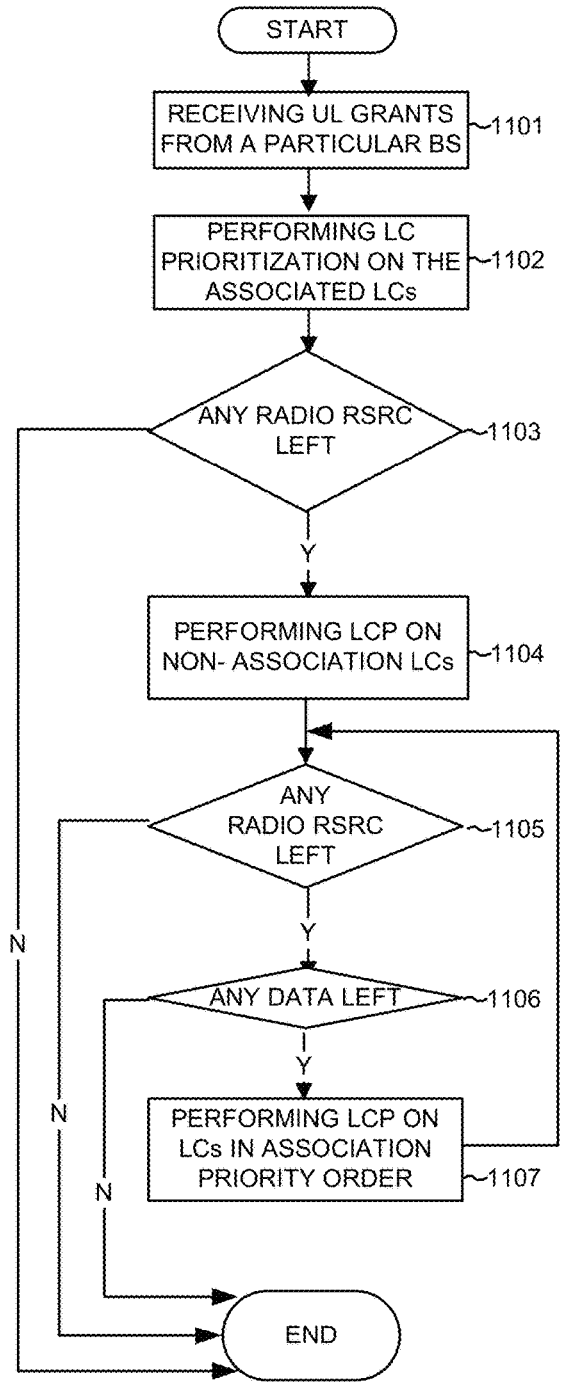
FIG. 11 shows an exemplary flow diagram of PDU transmitting based on BS priorities in accordance to embodiments of the current invention.

FIG. 11 shows an exemplary flow diagram of PDU transmission based on BS priorities in accordance to embodiments of the current invention. At step 1101, the UE receives UL grants from a particular BS. At step 1102, the UE performs LC prioritization on the associated LCs. Then UE chooses the LC with the highest priority to use. At step 1103, the UE determines if any radio resource left. If at step 1103, the UE determines that there is no more radio resource left, the UE terminates the procedure. If at step 1103, the UE determines that there are radio resources left, it moves to step 1104. At step 1104, the UE performs LCP on non-association LCs or for which the association with the particular BS is a lower priority to chooses a suitable LC to use. At step 1105, the UE determines if there is any radio resource left. If at step 1105, the UE determines there is no radio resource left, the UE terminates the procedure. If at step 1105 the UE determines that is resource left, the UE moves to step 1106. At step 1106, the UE determines if there any data left to be transmitted. If at step 1106 the UE determines that there is no more data left, the UE terminates the procedure. If at step 1106 the UE determines that there is data left, the UE moves to step 1107. At step 1107, the UE performs LCP on LCs in association priority order.

In one embodiment of the current invention, the UE can cancel a SR trigger for the LCs associated with one BS based a predefined condition detected for a different BS. The predefined conditions include, a BSR is transmitted and a UL grant is received such that all pending data are transmitted. For example, for SR transmitted through dedicated access channel, upon receiving UL grants from the selected BS, the UE instructs the multiplexing and assembly procedure to generate PDUs, which contains BSR and SDUs from the associated RBs. The UE subsequently cancels the triggered SR(s) if the PDUs includes a BSR which contains buffer status up to (and including) the last event that triggered a BSR or when the UL grants can accommodate all pending data available for transmission which belongs to the associated RBs. If the UL grants can accommodate all pending available for transmission, the SR triggered by the MAC entity for other BS should also be cancelled.

When UE are configured to associate with multiple schedulers, the UE may need to determine a number BSs needed to transmit SRs based on predefined criteria. In one embodiment of the current invention, the number of BSs needed is determines by either the required number of BSs for SR transmission or the number of BSs having SR resources configured, whichever is less. The UE then selects the number of BSs for SR transmission based on association priority. The UE can determine the required number of BSs for SR transmission based on one or more criteria. The first criterion is if the required number of BSs is configured by the RAN. The RAN configures a fixed number for BS selection through RRC signaling. The second criterion is if the buffered data volume exceeds a predefined threshold. For example, the buffered data volume is partitioned into different levels. Each level is mapped to a pre-defined number of BSs to which SR will be transmitted. The mapping relationship can be pre-configured or pre-defined in the specification. Taking Table 1 for example, if the data amount is less than or equal to Threshold-1, only one BS will be selected for SR. If the data amount is more than Threshold-1 and less than or equal to Threshold-2, two BSs will be selected for SR. If the data amount is more than Threshold 2 and less than or equal to Threshold 4, three BSs will be selected for SR. If the data amount is more than Threshold-3 and less than or equal to Threshold-4, four BSs will be selected for SR.

TABLE 1

Mapping relationship between the data amount and the number of BSs

| Data Amount/Number of LCs having data available | Number of BSs |
|---|---|
| 0 < Data Amount <= Threshold-1 | 1 |
| Threshold-1 < Data Amount <= Threshold-2 | 2 |
| Threshold-2 < Data Amount <= Threshold-3 | 3 |
| Threshold-3 < Data Amount <= Threshold-4 | 4 |

The third criterion is if the data available for transmission is for certain logical channel(s), multiple BSs will be selected. For example, for SRB for enhanced reliability, or for certain LC that is known to require high data transmission performance. Same as criterion 2, the number of such RBs or LCs having data available for transmission determines how many BSs will be selected. The fourth criterion is if the data available for transmission is for SRB and is a particular message, multiple BSs will be selected. For example, the particular message is an especially important message.

Figure 12:
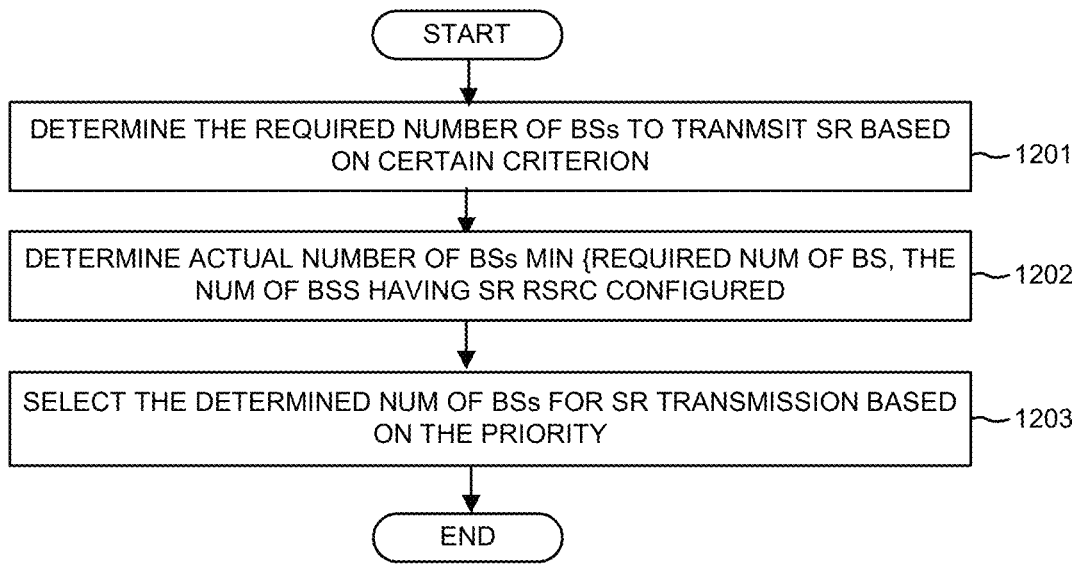
FIG. 12 is an exemplary flow diagram for selecting multiple BSs for SR sending in accordance with embodiments of the current invention.

FIG. 12 is an exemplary flow diagram for selecting multiple BSs for SR sending in accordance with embodiments of the current invention. At step 1201, the UE determines the required number of BSs to transmit the SRs based on certain criterion. At step 1202, the UE determines an actual number of BSs by taking the minimum of the number of required BSs and the number of BSs having resources configured. At step 1203, the UE selects the determined number of BSs for SR transmission base on the priority.

Figure 13:
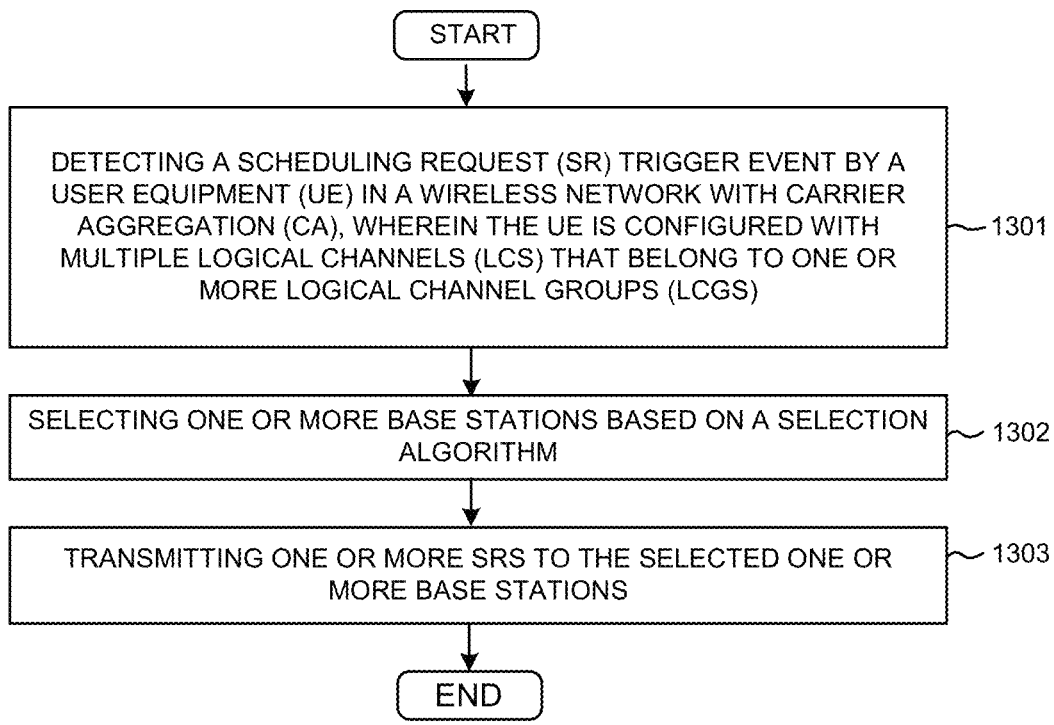
FIG. 13 is an exemplary flow diagram for SR transmission with multiple schedulers by selecting one or more base station stations based on selection algorithms.

FIG. 13 is an exemplary flow diagram for SR transmission with multiple schedulers by selecting one or more base station stations based on selection algorithms. At step 1301, the UE detects a scheduling request (SR) trigger event in a wireless network with carrier aggregation (CA), wherein the UE is configured with multiple logical channels (LCs) that belong to one or more logical channel groups (LCGs), and wherein at least one LC is configured to associate to multiple base stations with t association priorities. At step 1302, the UE selects one or more base stations based on a selection algorithm. At step 1303, the UE transmits one or more SRs to the selected one or more base stations.

Figure 14:
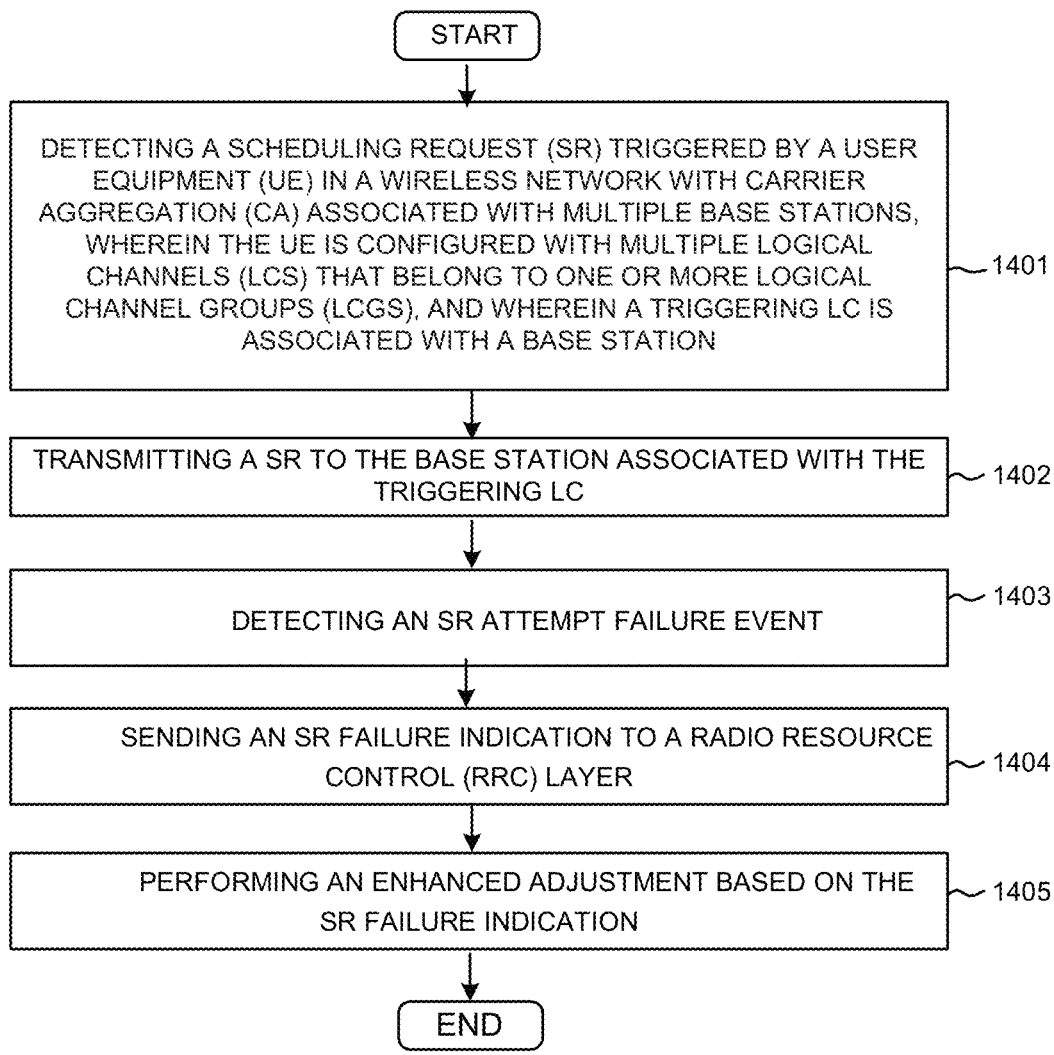
FIG. 14 is an exemplary flow diagram for SR transmission with bearer-binding configuration by performing enhanced adjustment based on SR failure indication.

FIG. 14 is an exemplary flow diagram for SR transmission with bearer-binding configuration by performing enhanced adjustment based on SR failure indication. At step 1401, the UE detects a SR triggered by a BSR in a wireless network with carrier aggregation (CA) associated with multiple base stations, wherein the UE is configured with multiple LCs that belong to one or more LCGs, and wherein a triggering DC, for which the BSR is triggered for, is associated with a base station or the triggering LC is associated with a base station with highest priority. At step 1402, the UE transmits a SR to the base station associated with the triggering LC. At step 1403, the UE detects an SR attempt failure event. At step 1404, the UE sends an SR failure indication to a radio resource control (RRC) layer. At step 1405, the UE performs an enhanced adjustment based on the SR failure indication.

In addition to be applicable to LTE system, in one embodiment, the enhanced mechanism of scheduling request can also be applied to New Radio (NR) radio access technologies and Multi-RAT Dual Connectivity (MR-DC) with multiple base station, e.g., one or more base stations illustrated in FIG. 1 and FIG. 2. The anchor base station 102 can be a master node MN and the drift base station 103 can be a secondary node SN. Each bases station has multiple cell groups which can be used to serve the UE.

E-UTRAN supports MR-DC via E-UTRA-NR Dual Connectivity (EN-DC), in which a UE is connected to one eNB that acts as a MN and one en-gNB that acts as a SN. The eNB is connected to the EPC via the S1 interface and to the en-gNB via the X2 interface. The en-gNB might also be connected to the EPC via the S1-U interface and other en-gNBs via the X2-U interface.

NextGen RAN (NG-RAN) supports NG-RAN E-UTRA-NR Dual Connectivity (NGEN-DC), in which a UE is connected to one ng-eNB that acts as a MN and one gNB that acts as a SN. The ng-eNB is connected to the 5GC and the gNB is connected to the ng-eNB via the Xn interface.

NG-RAN supports NR-E-UTRA Dual Connectivity (NE-DC), in which a UE is connected to one gNB that acts as a MN and one ng-eNB that acts as a SN. The gNB is connected to 5GC and the ng-eNB is connected to the gNB via the Xn interface.

As is known, according to radio interface protocols in LTE or NR, a radio bearer is used to transfer data and control between the UE and Radio Access Network (RAN). Radio bearers (RB) are for services provided by RLC/PDCP/BMC layer to higher layers. The RB may be classified into a signaling RB (SRB) for transferring RRC messages in the control plane and a data RB (DRB) for transferring user data in the user plane. Logical channels are used for services between the RLC sublayer and the MAC sublayer, and can be classified as either a control or traffic channel.

In an alternative embodiment, the preceding embodiments using the terminology "logical channel (LC)" illustrated in FIG. 1 to FIG. 14 can also be implemented using radio bearer. Correspondingly, one radio bearer may be associated with multiple cell groups (CGs) in different base stations.

In another embodiment, the soft-bearer-binding in the preceding embodiments may also be referred as split bearer, and the no-bearer-binding in the preceding embodiments may also be referred as master cell group (MCG) bearer/secondary cell group (SCG) bearer.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   detecting a scheduling request (SR) trigger event by a user equipment (UE) in a wireless network with a plurality of component carriers from multiple base stations, wherein the UE is configured with multiple radio bearers (RBs) that are associated to one or more logical channel groups (LCGs), wherein at least one RB with RLC bearers is configured to associate to multiple cell groups (CGs) in different base stations;
   selecting one or more base stations based on association priorities for the different base stations; and
   transmitting one or more SRs to the selected one or more base stations.

2. The method of claim 1, wherein the association priorities are configured by the wireless network via radio resource control (RRC) configuration.

3. The method of claim 1, wherein the association priorities are derived based on predefined UE configurations, comprising: a base station or a CG that houses a PCell for CA, a base station configured with femto or pico cells which have the highest priority, and a base station with cells configured with a predefined carrier frequency.

4. The method of claim 1, wherein the association priorities are derived from load information received by the UE.

5. The method of claim 1, wherein the association priorities are derived from radio measurements.

6. The method of claim 1, wherein the set of association priorities is specific to an access channel.

7. The method of claim 6, further comprising: declaring Radio Link Failure (RLF) for the CG upon detecting access failures on the associated base stations and all available access channels of the associated base station.

8. The method of claim 7, further comprising: initiating RRC connection re-establishment when RLF is declared for all base stations.

9. The method of claim 6, wherein dedicated access channels are given high priorities over contention based channels.

10. The method of claim 1, wherein more than one base stations are selected upon detecting one or more conditions comprising: a volume of buffered data for one or more RBs exceeding a predefined threshold, data available for transmission is for a RB with high performance requirement or for a signaling radio bearer (SRB) for enhanced reliability, data available for transmission is for SRB in a message, and a pathloss value is less than a predefined value.

11. The method of claim 1, further comprising:
    sending a buffer status report (BSR) to the selected one or more base stations.

12. The method of claim 1, further comprising:
    performing a logical channel prioritization (LCP) procedure based on the association priorities for a data transmission to a receiving base station.

13. The method of claim 12, wherein the LCP procedure involves:
    performing a LCP procedure on radio bearers associated with the receiving base station;
    determining whether there is any radio resource left; and performing a LCP procedure on radio bearers not associated with the receiving base station.

14. The method of claim 1, further comprising:
cancelling an SR to be sent to the selected base station upon detecting one or more conditions comprising: a buffer status report (BSR) being transmitted to the associated base station, and receiving an uplink grant that allows all data to be transmitted.

15. A method comprising:
detecting a scheduling request (SR) triggered by a user equipment (UE) in a wireless network with a plurality of component carriers from multiple base stations, wherein the UE is configured with multiple radio bearers (RBs) that are associated to one or more logical channel groups (LCGs) and the UE is associated with multiple cell groups (CGs) in different base stations, and wherein one or more RLC bearer is associated with a base station;
transmitting a SR to the base station associated with the RLC bearers;
detecting an SR attempt failure event;
sending an SR failure indication to a radio resource control (RRC) layer; and
performing an enhanced adjustment based on the SR failure indication.

16. The method of claim 15, wherein the SR attempt failure event is detected when a predefined SR maximum retry attempts have reached.

17. The method of claim 15, wherein the enhanced adjustment involves generating an RRC message indicating a SR failure and sending the RRC message to a Radio Access Network.

18. The method of claim 15, wherein the enhanced adjustment involves associating the RLC bearer with a different base station.

19. A user equipment (UE) comprising:
a transceiver that transmits and receives radio signals from multiple base stations in a wireless network;
a processor coupled to the transceiver and configured to:
detect a scheduling request (SR) trigger event;
configure a plurality of component carriers from multiple base stations, wherein the UE is configured with multiple radio bearers (RBs) that are associated to one or more logical channel groups (LCGs), and the UE is associated with multiple cell groups (CGs) in different base stations;
associate each radio bearer with one or more base stations according to predefined association priorities, wherein each radio bearer associates with one or more base stations with the same or different priority; and
select one or more base stations to which one or more SRs are sent based on the association priorities.

20. The UE of claim 19, wherein the association priorities are configured by the wireless network via a radio resource control (RRC) configuration.

21. The UE of claim 19, wherein the association priorities are derived based on predefined UE configurations, comprising: a base station or a CG that houses a PCell for CA, a base station configured with femto or pico cells which have the highest priority, and a base station with cells configured with a predefined carrier frequency.

22. The UE of claim 19, wherein the association priorities are derived from load information received by the UE.

23. The UE of claim 19, wherein the association priorities are derived from radio measurements.

24. The UE of claim 19, wherein the set of association priorities is specific to an access channel on which the SR is sent.

25. The UE of claim 24, wherein dedicated access channels are given high priorities over contention based channels.

26. The UE of claim 19, the processor is further configured to cancel an SR to be sent to the selected base station upon detecting one or more conditions comprising: a buffer status report (BSR) being transmitted to another base station, and receiving an uplink grant that allows all data to be transmitted.

27. The UE of claim 19, the processor is further configured to:
upon detecting a predefined number of SR attempt failures, send an SR failure indication to a radio resource control (RRC) layer and performs an enhanced adjustment based on the SR failure indication.

28. The UE of claim 27, wherein the enhanced adjustment involves generating an RRC message indicating a SR failure and sending the RRC message to a Radio Access Network.

29. The UE of claim 27, wherein the enhanced adjustment involves associating the triggering radio bearer with a different base station.

* * * * *